United States Patent [19]

Graaff

[11] Patent Number: 5,050,402
[45] Date of Patent: Sep. 24, 1991

[54] CONTAINER FOR TEMPERATURE-CONTROLLED AND ENVIRONMENTALLY CONTROLLED TRANSPORT OF PERISHABLE GOODS

[75] Inventor: Wolfgang Graaff, Hildesheim, Fed. Rep. of Germany

[73] Assignee: Graaff GmbH, Elze, Fed. Rep. of Germany

[21] Appl. No.: 523,595

[22] Filed: May 15, 1990

[30] Foreign Application Priority Data

May 16, 1989 [DE] Fed. Rep. of Germany ....... 3915925

[51] Int. Cl.⁵ .................... F17C 13/00; F25B 21/00
[52] U.S. Cl. ................................. 62/457.9
[58] Field of Search ........................ 62/457.9

[56] References Cited

U.S. PATENT DOCUMENTS 4,711,099  12/1987  Polan et al. .............. 62/457.9 X
4,722,199  2/1988   Hibino ..................... 62/457.9 X Primary Examiner—Lloyd L. King
Attorney, Agent, or Firm—Alan H. Levine

[57] ABSTRACT

The invention is directed to a container for environmentally controlled and temperature-regulated transport of perishable goods, the environment-controlling unit being arranged in the essentially cuboid container in the region of the one end face thereof as a component, which is to be allocated to the container and to be separated from it. The environment-controlling unit is broken up into functionally connected components, or is composed of components, which are functionally connected with one another, the components being allocated to the region or regions between the temperature-regulating unit and a container corner post at the side of the temperature-regulating unit. In this way, space within the container is utilized, which previously was unused and was filled with foam, as were the container side walls, in order to avoid heat bridges. Because of its shape, the space gained makes it possible that environment-controlling equipment with an air separator can be used, in which the air of the surroundings is split into the oxygen and nitrogen, which are required for control of the environment.

7 Claims, 4 Drawing Sheets

CONTAINER FOR TEMPERATURE-CONTROLLED AND ENVIRONMENTALLY CONTROLLED TRANSPORT OF PERISHABLE GOODS

Temperature-controlled transport containers, particularly so-called refrigerated containers, are well known. In connection with the present invention, these are relatively large containers in the form of a horizontal cuboid with standardized dimensions. To one end face of such a container, a temperature regulating unit is applied as a complete, operative unit, which is purchased by the manufacturers of the containers from suppliers and mounted on the largely finished container merely by establishing the necessary functional and mechanical connections.

The temperature-controlling units, in turn, are structural components of standardized dimensions. Only infrequently do the standardized dimensions of containers and temperature-controlling units fit optimally together. The temperature-controlling units are inserted in one end face of a container in such a manner that they are symmetrically disposed between two end-face corner posts of the containers, and the areas between the 2-part temperature-controlling unit and the corner post of the associated end face are closed off with lining plates. These side linings are, like the other walls of the container, insulating double-wall sections with an insulating layer between two cover plates (sandwich constructions), the insulating layer frequently being a rigid foam, which is produced in situ between the cover plates. If necessary, hollow sections are formed, which are used as air ducts.

The goods, which are transported in the temperature-controlled containers, mostly or at least frequently, are tropical and subtropical fruits. As the distances, over which such highly sensitive products are transported increase, and as more sensitive products are being included, the requirements which the transporting conditions must fulfill are becoming more stringent. Moreover, the environment within the temperature-controlled containers is also being controlled to an increasing extent. Temperature-controlling units continue to be used to determine the temperature in the interior of the container. In addition, the units controlling the environment ensure that the air composition, e.g., the relative humidity, are appropriate. Also, the units controlling the environment are pre-manufactured units, which are applied in the operative state or they are assembled from the individual components to the outside or inside of the container and connected together. If they are mounted on the outside of the container, special measures must be taken to protect them against the weather and against being damaged. If they are mounted on the inside of the container, it is also necessary to protect them o against damage; in addition, they adversely affect the usable capacity of the container. In any case, the types previously used encourage making do without controlling the environment or providing the equipment for controlling the environment only with the components that are necessary, instead of aiming for an optimum mode of operation and/or an optimum control of the environment.

It is an object of the invention to construct a generic container in such a manner that optimum regulation of the temperature and control of the environment are possible, the cost of constructing such a container is kept within justifiable limits, and the usable capacity is adversely affected, at worst, to a slight extent.

Pursuant to the invention, this objective is accomplished in accordance with the description below, of an example of an embodiment of the invention, made with reference to the drawing.

It is important for achieving the objects of the invention that small units, in their totality, are adequate for sufficient control of the environment. For this purpose, appropriate construction of the container is helpful. Such construction includes, in particular, a container that, as a whole, is well protected against external influences. An essential point of the invention therefore is a container in which there is the least possible uncontrolled exchange of medium between the inside and the outside. Therefore, as a preferred application of the invention, a hermetically sealable container, or a container with an exclusively forcibly controlled exchange of climate or atmosphere, is provided.

Figure 1:
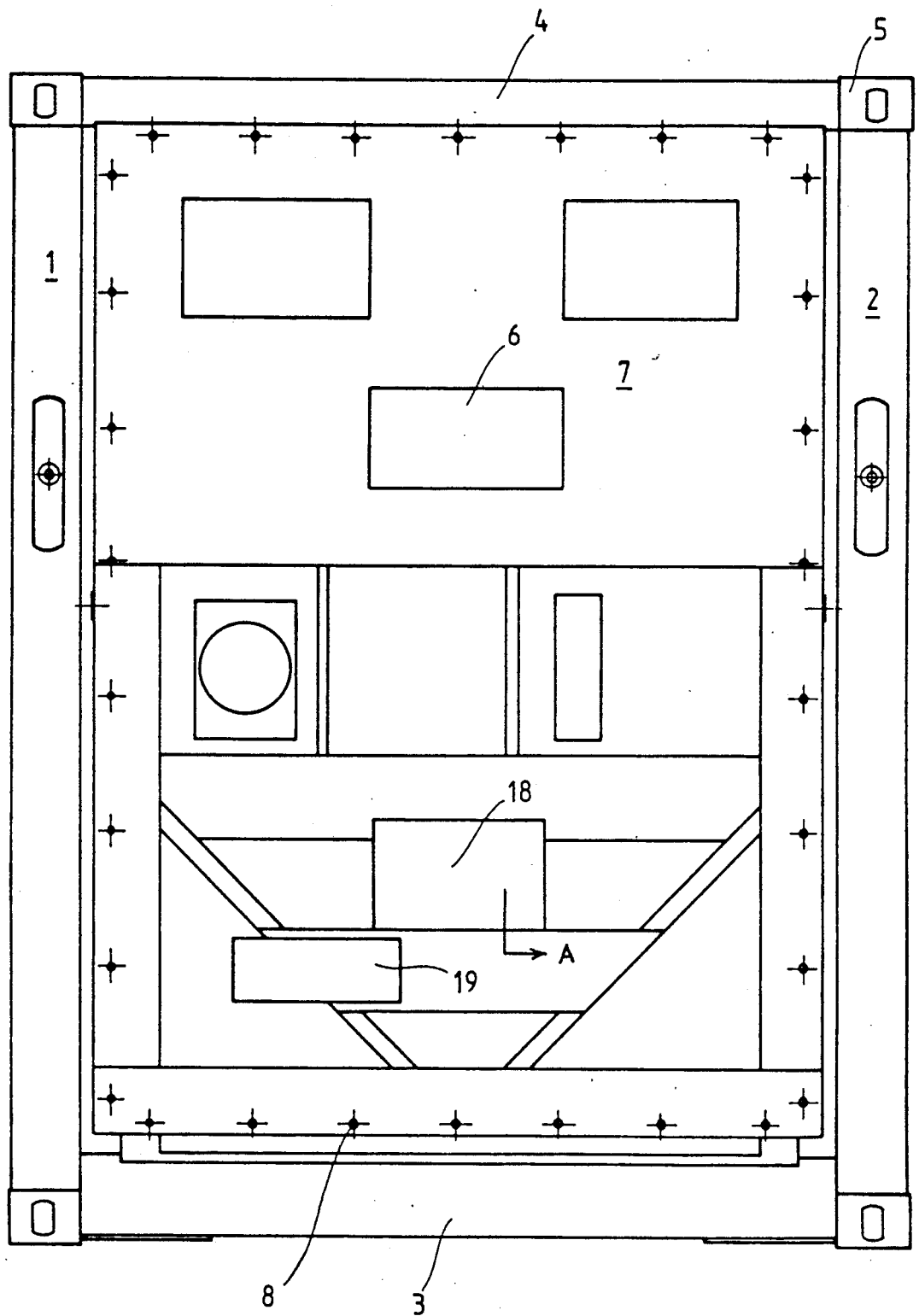
FIG. 1 is an end face view of a container which is equipped, according to the invention, and to which a temperature-regulating unit is assigned.

Referring to FIG. 1, one end face of a standardized large container, which has the shape of a horizontal cuboid, is characterized by two lateral, vertical corner posts 1, 2, a lower transverse girder 3 and an upper transverse girder 4. The conventional corner fittings 5 are also standardized and similar to one another. The individual components of the temperature regulating unit are characterized by rectangles 6 and associated with a common base plate 7. Base plate 7, with the installed parts 6, is associated with an end wall of the container within the region circumscribed by the corner posts 1, 2 and the transverse girders 3, 4 and held with screw or rivet connections 8.

Figure 2:
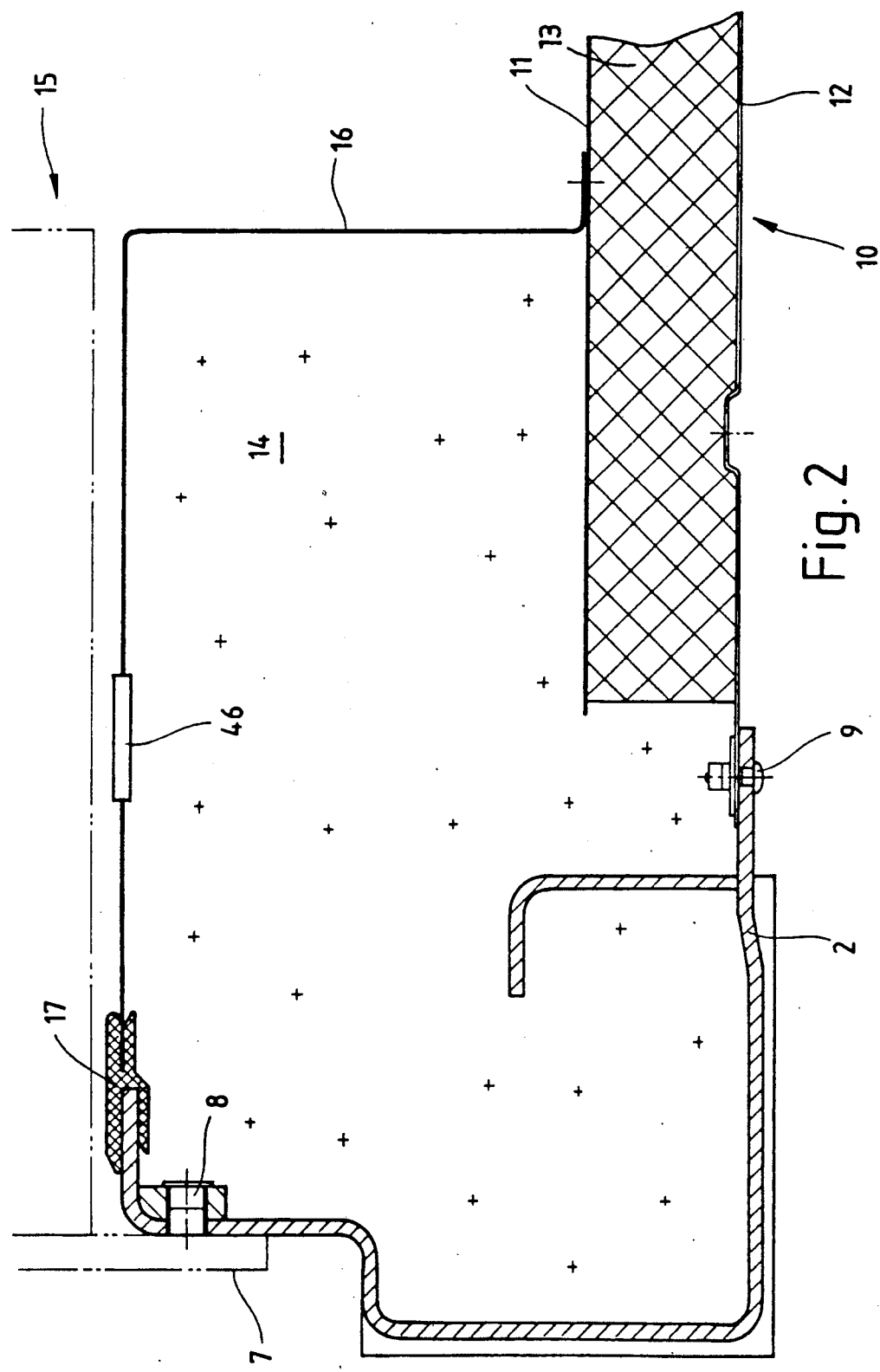
FIG. 2 is a horizontal cross-sectional view of one corner region of the container of FIG. 1 in the area of the end face, which is shown as a frontal view in FIG. 1.

Referring to FIG. 2, each of the corner columns 1, 2 is an open angle section, to one flange of which plate 7 is screwed with an appropriate number of bolted connections 8. One side wall 10 is fastened to the corner post 2 by riveted connections 9. It can be seen that side wall 10 has a sandwich construction, i.e., the two cover plates 11, 12 between which is supporting and insulating material 13, preferably comprising a rigid foam. The latter has been foamed in the region between the cover plates 11, 12, is disposed between the cover plates 11, 12, and is connected to the plates. As with the previously customary constructions, and as shown in FIG. 2, a space remains free in the area of the corner posts between the corner post 2 and the side wall 10, on the one hand, and the temperature regulating unit 15, on the other. This space is covered with sheet metal 16 and filled with a rigid foam 14, which is similar to the rigid foam 13, to prevent the formation of a temperature bridge. The space thus is a chimney-like space between the floor and roof regions of the container on either side of the temperature-regulating equipment. Once again, to avoid temperature bridges, the sheet metal 16 is connected by means of a rubber strip 17 to corner post 2.

According to the invention, the space which in conventional containers is filled with rigid foam is used to accommodate the components of the equipment for controlling the environment. In the generally customary symmetrical arrangement of the temperature-regulating unit between the two corner posts, this space is on either side of the temperature-regulating unit, or on one side of the temperature-regulating unit, or between the temperature-regulating unit and a corner post after the temperature-regulating unit has been moved as much as structural factors permit towards the other corner post of this end wall of the container. This variation has the advantage that a relatively large coherent space is available for accommodating the components of the equipment for controlling the environment. In order to be flexible to the greatest extent possible in accommodating the components of the equipment for controlling the environment, the compressor belonging to such equipment is accommodated, in all the described variations of the placement of the temperature-regulating unit, between the corner posts spatially separate from the remaining equipment for controlling the environment in the region, which is available to the temperature regulating unit or is taken up by this unit. In a series of conventional commercial temperature-regulating units, this space is originally available without previously having been used. However, investigations of conventional commercial temperature-regulating units, which come into consideration here, have shown that with very slight changes, particularly an insignificant shift of the compressor 18 of the temperature-regulating unit, at the very least a space can be created which is needed to accommodate the compressor 19 of the environment-controlling equipment.

In FIG. 1, compressor 18 of the temperature-regulating unit 15 is disposed so that the compressor 19 of the environment-controlling equipment cannot be accommodated in the area of the temperature-regulating unit without making some changes. The arrow A, however, indicates how by slightly shifting the compressor 18 on the plate 7 of the temperature-regulating unit, sufficient space can be created in order to be able to also place compressor 19 of the equipment for controlling the environment on plate 7.

Since the space or spaces on the side of the temperature regulating unit make available a chimney-like, that is, a relatively elongated space, it is possible without providing additional space for the installation, to assign to equipment 20 for controlling the environment a separator 25, which necessarily is a relatively elongated tubular component, the accommodation of which has previously always presented problems and which has therefore usually been omitted. For good control of the environment, oxygen and nitrogen are both required, in a ratio of one to the other which depends on the goods being transported. For this reason, oxygen and nitrogen have been carried in liquid form in cylinders within containers having a controlled temperature and environment. This is expensive and cumbersome. On the other hand, when a separator is used, the oxygen and nitrogen can be obtained from the air surrounding the container by splitting this air. It is therefore not necessary to carry special cylinders for oxygen and nitrogen, which would require space and increase the dead weight of the container.

Figure 4:
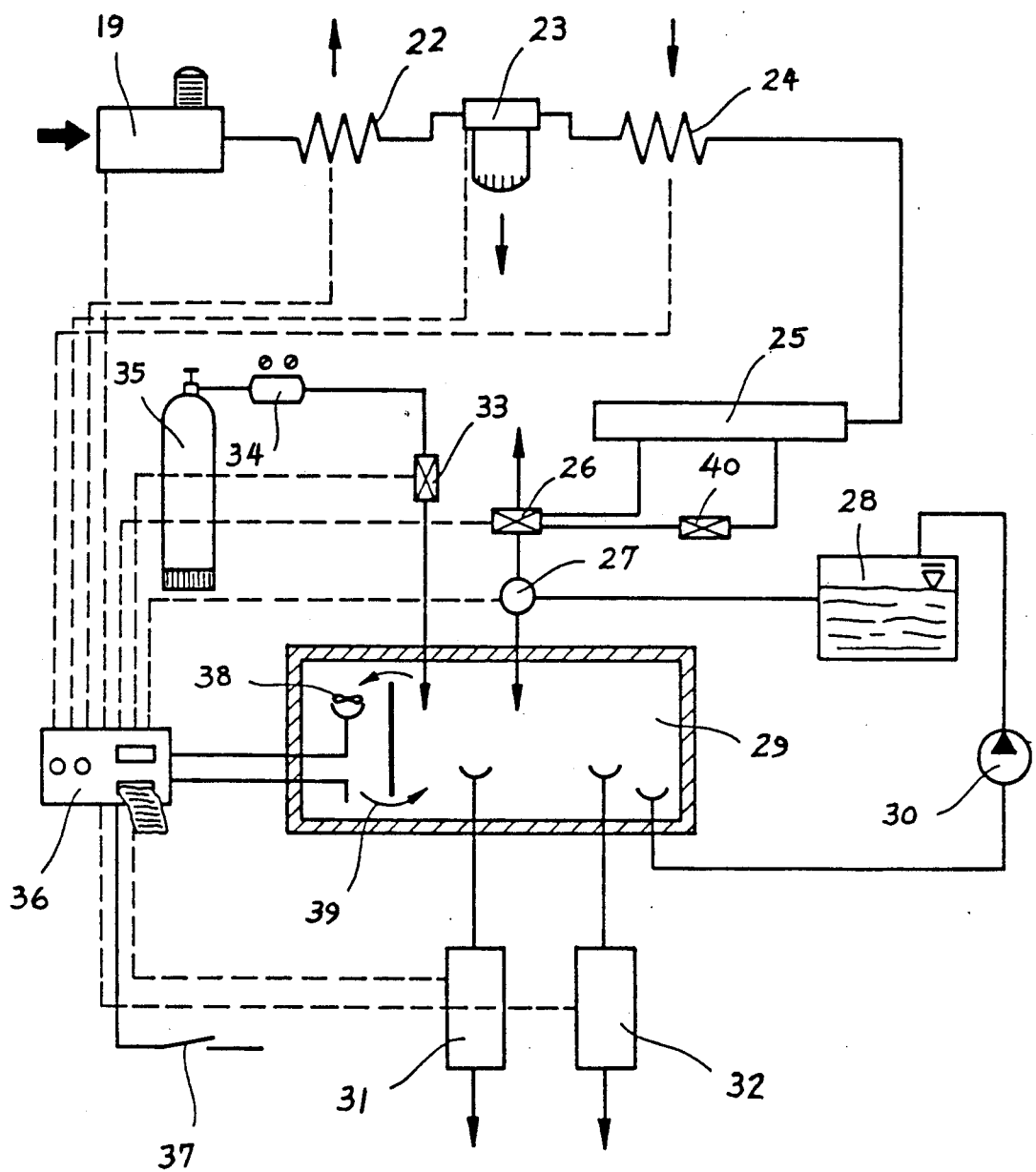
FIG. 4 is a block diagram of the environment-controlling equipment.

Equipment according to the invention for controlling the environment, which is appropriate according to the foregoing, is shown as block diagram in FIG. 4. The individual parts of FIG. 4 have the meaning given below. The function of the individual parts is not described in great detail, because the equipment is conventional, with the exception that a separator 25 is connected to it, to which air is supplied from the surroundings by way of the compressor 19 and the subsequent components 22 to 24, in order to be split the air into oxygen and nitrogen. These gases are required in different ratios of one to the other for controlling the environment of different products. After being split in the separator 25, the oxygen and the nitrogen are brought together again pursuant to the invention in different ratios, that is, adapted to the needs of the particular case. This ratio is determined in the computer 36 as the controlling unit of the equipment 20 for controlling the environment.

| Explanation of the Equipment 20 for Controlling the Environment of the Block Diagram of FIG. 4 | |
|---|---|
| 19 compressor | 31 $CO_2$ scrubber |
| 22 condenser | 32 ethylene scrubber |
| 23 filter | 33 valve |
| 24 heater | 34 pressure reducer |
| 25 $N_2/O_2$ separator | 35 $CO_2$ flange |
| 26 valve | 36 computer |
| 27 humidifier | 37 door switch |
| 28 water tank | 38 fan |
| 29 container | 39 air circulation through cooling unit |
| 30 water pump | 40 pressure-regulating valve |

If for any reason whatsoever the oxygen and/or nitrogen content of the surrounding air does not suffice, then that portion, which cannot be obtained by means of the separator 25 from the air of the surroundings can be supplied by cylinders, which are carried along. However, the number of such cylinders is substantially smaller, and the space they occupy is substantially less, than would be the case if the whole of the nitrogen and/or oxygen required were to be supplied from a large number of cylinders, which would require a correspondingly large space.

Figure 3:
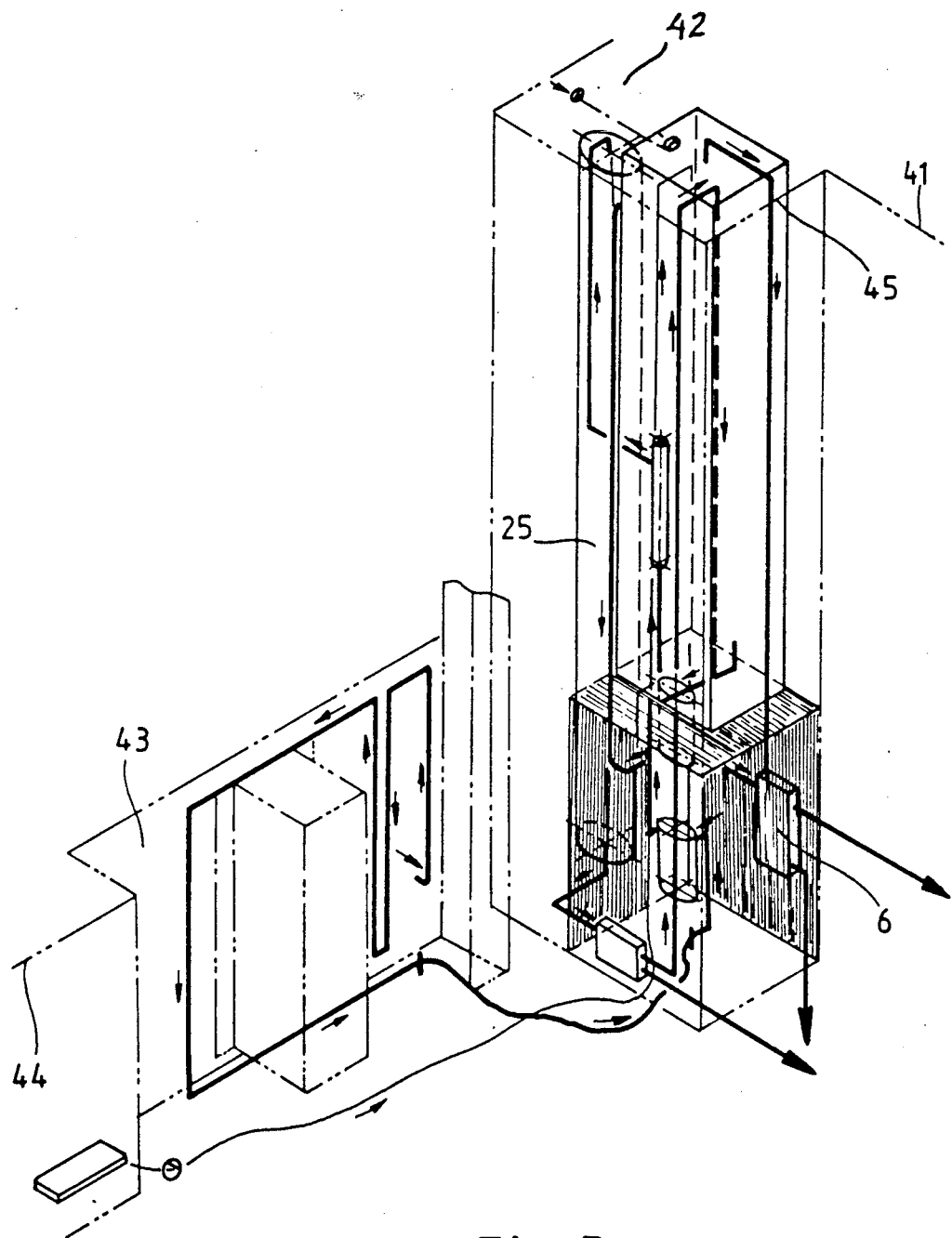
FIG. 3 is a perspective view, seen from the interior of the container, of the region shown in horizontal section in FIG. 2.

It can be seen from FIG. 3 how the region at the side of the temperature-regulating unit appears as an upright, chimney-like space, in which the necessarily elongated separator 25 can easily be accommodated. The region at the side of the temperature-regulating unit appears as niche-like space 42, which is recessed from the actual side wall (continuous line 41) and in which one corner post of the container and the component 6 of the environment-controlling equipment are accommodated in a meaningful and appropriate manner relative to each other. If necessary, a niche-like region 43 in the container side wall (continuous line 44) on the other side of the corner post, particularly in the lower region of the wall, can also be used to accommodate individual components of the environment-controlling equipment. The functional connection of the components of the environment-controlling equipment to one another presents no problem, because they are close to each other in the region of the corner post. In the case given, that is, with the symmetrical arrangement of the temperature-regulating unit in the center of the end wall, appropriate smaller environment-controlling devices can be accommodated on either side of the temperature-regulating unit. If the temperature-regulating unit is displaced to the side, a correspondingly larger environment-controlling facility can be accommodated in the described manner in the region of the larger distance between the temperature-regulating unit and the environment-controlling equipment.

Since the components of the environment-controlling equipment require maintenance, it should be possible to make them accessible without special effort. For this purpose, flaps or covers have been disposed in the walls of the niche 42. In order to be subjected to the least possible limitations in their location and, in particular, in order to be able to arrange flaps and covers in the side wall 45 of the niche 42, the temperature-regulating unit 15, with its holding plate 7, is supported so that it can be pivoted about hinges having a vertical swing axis. These hinges are disposed in the corner post region. If the environment-controlling equipment is accommodated on one side, this corner post region is separated from the environment controlling equipment, so that flaps or covers in the niche side wall 45, which in the representation of FIG. 2 is the one section of the region defined by element 16, become accessible when the temperature regulating unit is swung out of the way. Such a flap, or cover or the like, is shown diagrammatically in FIG. 2 and labelled 46.

The container of this invention is a container which can be closed off absolutely tightly against unwanted exchange of air with the atmosphere. The connecting regions between the side walls, the roof, and the floor are to be insulated absolutely tightly, just as the walls, the roof, and the floor are to have optimum insulating properties. It is important that such an exchange of atmosphere in the door region be prevented reliably or, at the very least, minimized as much as possible when the doors are closed. For such a container, temperature-regulating and environment-controlling equipment of relatively small capacity can be used, and the parts of this equipment can be of small size and accommodated correspondingly appropriately. This is the case particularly also for the separator 25 in the elongated, cylindrical form.

For the purposes of the invention, the separator 25 is preferably arranged vertically. However, the separator 25 could be disposed in a horizontal position above or below the temperature-regulating equipment.

Obviously, on the one hand, the separator is of particular importance for control of the environment according to the invention; on the other hand, it is a particularly bulky and space-consuming device. Every effort must therefore be made to keep the separator small and as effective as possible. A prerequisite for this is the use of the invention with a container, which originally is particularly tight and which has no uncontrolled connections with the surroundings. From this point of view, a particular weakness are the doors, which large containers generally have for loading and unloading, and which are therefore to be particularly tightly closing for a container of this invention.

A concluding proposal therefore consists of the use of climate-controlling equipment, designed pursuant to the invention, which can be closed off or barricaded off hermetically against the environment or connected therewith only in a controlled manner, particularly in the door regions.

I claim:

1. A container for the temperature-controlled and environmentally-controlled transport of perishable goods, comprising:
    a closed container having a wall supported between vertical corner posts and horizontal top and bottom girders,
    a temperature-regulating unit mounted on that wall for controlling the temperature within the container, the temperature-regulating unit being spaced from the corner posts and girders, and
    an environment-regulating unit for controlling the environment within the container, the environment-regulating unit including a number of individual components physically separated from each other, and means for functionally interconnecting said components, and
    the components of the environment-regulating unit being located in the spaces between the temperature-regulating unit and the corner posts and girders.

2. A container as defined in claim 1 wherein the environment-regulating unit controls the relative humidity within the container.

3. A container as defined in claim 1 wherein the environment-regulating unit controls the proportion of oxygen and nitrogen within the container.

4. A container as defined in claim 3 wherein one of the components of the environment-regulating unit is a separator for splitting the air surrounding the container into oxygen and nitrogen.

5. A container as defined in claim 4 wherein the separator is an elongated component located in an upright position adjacent to one of the corner posts, between that post and the temperature-regulating unit.

6. A container as defined in claim 4 wherein the separator is an elongated component located horizontally above or below the temperature-regulating unit, and between that unit and one of the girders.

7. A container as defined in claim 1 including a wall enclosing the space between the temperature-regulating unit and at least one of the corner posts, at least some of the components of the environment-regulating unit being located within the enclosed space, and a flap or cover closing an opening in the wall through which access can be gained to the components.

* * * * *